US007074351B2

(12) United States Patent
Döbler et al.

(10) Patent No.: US 7,074,351 B2
(45) Date of Patent: Jul. 11, 2006

(54) IR-ABSORBING COMPOSITIONS

(75) Inventors: Martin Döbler, Düsseldorf (DE); Werner Hoheisel, Köln (DE); Helmut Schmidt, Saarbrücken (DE); Ralph Nonninger, Saarbrücken (DE); Martin Schichtel, Saarbrücken (DE); Martin Jost, Saarbrücken (DE)

(73) Assignee: Leibniz-Institut fur Neue Materialien gem. GmbH, Saarbrücken (DE)

( * ) Notice: Subject to any disclaimer, the term of this patent is extended or adjusted under 35 U.S.C. 154(b) by 404 days.

(21) Appl. No.: 10/258,994

(22) PCT Filed: Apr. 23, 2001

(86) PCT No.: PCT/EP01/04548

§ 371 (c)(1),
(2), (4) Date: Oct. 31, 2002

(87) PCT Pub. No.: WO01/85833

PCT Pub. Date: Nov. 15, 2001

(65) Prior Publication Data

US 2003/0094600 A1 May 22, 2003

(30) Foreign Application Priority Data

May 5, 2000 (DE) ................. 100 22 037

(51) Int. Cl.
*F21V 9/14* (2006.01)
*G02B 5/22* (2006.01)
*G02C 5/30* (2006.01)
*B32B 1/00* (2006.01)

(52) U.S. Cl. ............. 252/587; 252/582; 252/584; 252/589; 252/585; 428/357; 428/383; 428/402; 524/480; 264/464; 264/478

(58) Field of Classification Search ......... 252/511, 252/518.1, 520.1, 582–587; 359/885; 264/464, 264/478; 524/198, 560, 480–445; 428/357–421
See application file for complete search history.

(56) References Cited

U.S. PATENT DOCUMENTS

| | | | |
|---|---|---|---|
| 2,991,273 A | 7/1961 | Hechelhammer et al. | |
| 2,999,835 A | 9/1961 | Goldberg | |
| 2,999,846 A | 9/1961 | Schnell et al. | |
| 3,028,365 A | 4/1962 | Schnell et al. | |
| 3,148,172 A | 9/1964 | Fox | |
| 3,271,367 A | 9/1966 | Schnell et al. | |
| 3,737,409 A | 6/1973 | Fox | 260/49 |
| 3,879,348 A | 4/1975 | Serini et al. | 260/47 XA |
| 4,715,986 A * | 12/1987 | Gruning et al. | 516/100 |
| 4,982,014 A | 1/1991 | Freitag et al. | 568/721 |
| 5,126,428 A | 6/1992 | Freitag et al. | 528/196 |
| 5,227,458 A | 7/1993 | Freitag et al. | 528/196 |
| 5,288,778 A | 2/1994 | Schmitter et al. | 524/100 |
| 5,518,810 A * | 5/1996 | Nishihara et al. | 428/328 |
| 5,807,511 A * | 9/1998 | Kunimatsu et al. | 252/587 |
| 5,821,380 A | 10/1998 | Holderbaum et al. | 558/443 |
| 5,834,147 A * | 11/1998 | Nagae et al. | 430/67 |
| 5,883,165 A | 3/1999 | Kröhnke et al. | 524/111 |
| 6,200,680 B1 * | 3/2001 | Takeda et al. | 428/402 |
| 6,296,943 B1 * | 10/2001 | Watanabe et al. | 428/447 |
| 6,329,058 B1 * | 12/2001 | Arney et al. | 428/403 |
| 6,455,158 B1 * | 9/2002 | Mei et al. | 428/403 |
| 6,833,088 B1 * | 12/2004 | Isobe et al. | 252/520.1 |
| 2003/0122114 A1 | 7/2003 | Dobler et al. | |

FOREIGN PATENT DOCUMENTS

| | | |
|---|---|---|
| EP | 0687923 | 12/1995 |
| GB | 1122003 | 7/1968 |
| GB | 1367788 | 9/1974 |
| GB | 1367790 | 9/1974 |
| JP | 61-62039 | 3/1986 |
| JP | 61-62040 | 3/1986 |
| JP | 61-105550 | 5/1986 |
| JP | 06-184470 * | 7/1994 |
| JP | 7-278795 | 10/1995 |
| JP | 687923 A2 * | 12/1995 |
| JP | 8-11266 | 1/1996 |
| JP | 8-41441 | 2/1996 |
| JP | 09-059591 * | 3/1997 |
| JP | 09-316363 * | 12/1997 |
| WO | 0014017 | 3/2000 |

OTHER PUBLICATIONS

Houben-Weyl, vol. E 9d, Thieme Verlag, Stuttgart, (month unavailable) 1998, pp. 717-824, M. Hanack, H. Heckmann and R. Polley, "Phathalocyanines and Related Compounds".
Database WPI, Section Ch, Week 199719 Derwent Publications Ltd., London, GB; AN 1997-209595 XP002173525 -& JP 09 059591 A (Nippon Shokubai Co Ltd), Mar. 4, 1997 Zusammenfassung.
English Language Abstract of JP 61-105550.

* cited by examiner

*Primary Examiner*—Mark Kopec
*Assistant Examiner*—Kellambella Vijayakumar

(57) ABSTRACT

The present invention provides compositions containing transparent thermoplastic polymer, surface-modified oxide particles with a particle size of less than 200 nm, and organic NIR absorbers. The compositions of the present invention may find use in reducing diathermancy in sheets, films, glazing systems and roofing systems which may be incorporated into automobiles and buildings.

60 Claims, No Drawings

IR-ABSORBING COMPOSITIONS

FIELD OF THE INVENTION

The present invention concerns compositions containing transparent thermoplastic polymers and surface-modified oxide particles having a particle size of less than 200 nm and organic NIR absorbers together with their manufacture, use and products manufactured therefrom.

BACKGROUND OF THE INVENTION

In the automotive sector and in buildings, glazing systems made from compositions containing transparent thermoplastic polymers such as e.g. polycarbonate offer many advantages over conventional glazing systems made from glass, such as e.g. greater break resistance or weight savings. In the case of automotive glazing systems, they provide greater passenger safety in the event of traffic accidents, and the weight savings reduce fuel consumption. Finally, transparent thermoplastic polymers and compositions containing transparent thermoplastic polymers provide substantially greater design freedom due to their easier mouldability.

However, the high diathermancy (i.e. transmittance for IR radiation) of transparent thermoplastic polymers leads to an undesirable temperature rise inside the vehicle under the influence of sunlight. As described by Parry Moon, Journal of the Franklin Institute 230, pages 583–618 (1940), most solar energy lies within the near infrared (NIR) range between 750 and 2500 nm, next to the visible range of light between 400 and 750 nm. Penetrating solar radiation is absorbed inside a vehicle, for example, and emitted as long-wave heat radiation of 5 to 15 µm. Since conventional glazing materials and transparent thermoplastic polymers in particular are not transparent in this range, the heat radiation cannot dissipate to the outside. A greenhouse effect is obtained. In order to minimise this effect as far as possible, the transmission of glazing in the NIR should be kept as low as possible. Conventional transparent thermoplastic polymers, such as e.g. polycarbonate, are however transparent in both the visible range and in the NIR, however. Therefore additives, for example, are needed that demonstrate as low a transparency as possible in the NIR with as high a transparency as possible in the visible range of the spectrum.

For applications in the automotive glazing sector a transmission in the visible range (LTA value) of at least 70% is prescribed in most cases. This value is defined in SAE J 1796 (issued May 1995).

The TDS value (solar-direct transmittance) according to SAE J 1796, issued May 1995, is used for efficiency of heat absorption. The value describes the percentage of solar energy that penetrates the sample and thus contributes to heating the interior.

Various heat-repellent systems having a low transmission in the NIR have been described in the literature. Surface coatings or paint systems are known on the one hand, and on the other hand there are also infrared-absorbing additives for transparent thermoplastic polymers. Since compositions comprising polymer and additive can be produced more cost-effectively, an NIR-absorbing additive would be desirable.

Examples of known NIR-absorbing additives include organic infrared absorbers, as described for example in J. Fabian, H. Nakazumi, H. Matsuoka, Chem. Rev. 92, page 1197 et seq. (1992).

Until now, however, no organic NIR absorbers have been known that on the one hand display suitable thermal and light stability and on the other hand reach a TDS of below 50% with an LTA of over 70%.

On the other hand, paint systems having NIR-absorbing particles consisting of indium tin oxide (ITO) have been described in the literature (e.g. in WO 00/14017). Depending on their composition and concentration, such additives likewise absorb in the NIR range. ITO particles that are embedded in an organic or inorganic matrix of a paint and that absorb NIR light effectively as well as being highly transparent in the visible range are known from JP-A 08011266, JP-A 0707482 and from JP-A 08041441.

The disadvantages of the paint systems described in the previous paragraph, however, are that they require a complex painting stage and that, incidentally, a sufficient quantity of ITO cannot be incorporated into the known paint systems without their becoming unstable.

In JP-A 070278795 polycarbonate is mixed with conventional ITO with the aid of a kneader. However, no reference was made to the transparency of the mixture. Conventional ITO produces cloudy composites with polycarbonate. This is not suitable for many of the desired applications in this case, e.g. for glazing systems.

When they are finely divided, conventional NIR-absorbing nanoparticles (nanoparticles should hereafter be understood to refer to particles having a size of less than 200 nm), which are invisible because of their small size, are suitable for inclusion in a paint system but not for incorporation into a thermoplastic polymer, since under conventional incorporating conditions the nanoparticles agglomerate, forming cloudy compositions due to light scattering at the agglomerates.

Until now, no thermoplastic moulding compositions with NIR-absorbing nanoparticles have been known that reach a TDS value of below 50% with an LTA value of over 70%.

Given the high cost of NIR-absorbing nanoparticles, it is further desirable to develop compositions that require as small as possible a proportion of these NIR-absorbing nanoparticles.

NIR absorbers which on the one hand absorb in a wide NIR range and yet at the same time demonstrate high transparency in the visible range of the electromagnetic spectrum, and which can be incorporated into transparent thermoplastic polymers without agglomerating, are desirable.

DETAILED DESCRIPTION OF THE INVENTION

The object of the present invention is therefore to provide compositions that exhibit an LTA value of $\geq 70\%$ and a TDS value of <50%, preferably <40%, and hence offer an effective thermal insulation for glazing systems and similar applications. The remaining spectrum of material properties of the composition should as far as possible not be impaired. The disadvantages of the compositions known from the prior art should be overcome.

The compositions to be provided should preferably exhibit an LTA value of $\geq 70\%$ and a TDS value of <50%, preferably <40%, and hence offer an effective thermal insulation for glazing systems and similar applications.

It has now surprisingly been found that by adding surface-modified oxides having a particle size of less than 200 nm together with organic NIR absorbers to transparent thermoplastic polymers, compositions are obtained that display a high transparency in the visible range of light and at the same time display an intensive absorption in the near infrared. These compositions can be produced e.g. by extrusion or by means of a kneader.

The compositions according to the invention have numerous advantages. The material properties of the compositions determined by the transparent thermoplastic polymer and optionally by other additives that are present are not substantially impaired by the oxide particles according to the invention and the organic NIR absorbers.

Furthermore, the compositions according to the invention have the advantages of high light resistance, high thermal stability and slight inherent colour.

The compositions according to the invention have the further advantage that the NIR-absorbing nanoparticles according to the invention need to be used in only small quantities. This is beneficial because NIR-absorbing nanoparticles are expensive. This is possible because the combination of NIR-absorbing nanoparticles and organic NIR absorbers has a synergistic effect on NIR absorption.

The invention therefore provides compositions containing
a) a transparent thermoplastic polymer and
b) oxide particles selected from the group consisting of indium oxide in which 2 to 30% of the indium atoms are replaced by tin atoms, indium oxide in which 10 to 70% of the oxygen atoms are replaced by fluorine atoms, tin oxide in which 2 to 60% of the tin atoms are replaced by antimony atoms, tin oxide in which 10 to 70% of the oxygen atoms are replaced by fluorine atoms, zinc oxide in which 1 to 30% of the zinc atoms are replaced by aluminium atoms, zinc oxide in which 2 to 30% of the zinc atoms are replaced by indium atoms, zinc oxide in which 2 to 30% of the zinc atoms are replaced by gallium atoms, perovskites, and compounds having the composition $A_xBO_{3-y}$, whereby
$0.01<x<3$,
preferably $0.1<x<1$ and
$0.001<y<1.5$,
preferably $0.1<y<0.5$, and
A=Ca, Sr, Ba, Al, In, Sn, Pb, Cu, Ag, Cd, Li, Na, K, Rb, Cs, La, Ce, Pr, Nd, Sm, Eu, Gd, Th, Dy, Ho, Er, Tm, Yb, Lu, H or $NH_4$,
B=W, Mo or Re and
whereby the average particle size of the oxide particles (measured by ultracentrifugation) is less than 200 nm, and whereby the surface of the oxide particles is modified with a polyvinyl acetal or with a compound having the general formula (I)

$$SiR^1R^2R^3R^4 \qquad (I)$$

where
$R^1$=alkyl substituent with 1 to 30, preferably 6 to 20, particularly preferably 12 to 18 C atoms,
$R^2$=alkyl substituent with 1 to 30, preferably 1 to 18, particularly preferably 1 to 6 C atoms or alkoxy substituent with 1 to 30, preferably 1 to 6, particularly preferably 1 to 2 C atoms or Cl or Br or I,
$R^3$=alkyl substituent with 1 to 30, preferably 1 to 18, particularly preferably 1 to 6 C atoms or alkoxy substituent with 1 to 30, preferably 1 to 6, particularly preferably 1 to 2 C atoms or Cl or Br or I,
$R^4$=alkoxy substituent with 1 to 30, preferably 1 to 6, particularly preferably 1 to 2 C atoms or Cl or Br or I, and
c) organic NIR absorbers.

The organic NIR absorbers according to the invention are preferably used in a concentration of 0.1 ppm to 1 wt. %, particularly preferably between 1 ppm and 1000 ppm and most particularly preferably between 30 and 200 ppm.

The oxide particles according to the invention are preferably contained in the compositions according to the invention in concentrations of 1 ppm to 10 wt. %, particularly preferably between 100 ppm and 5 wt. % and most particularly preferably between 0.2 wt. % and 2 wt. %.

These concentrations relate to 1 mm to 10 mm thick layers. For thinner layers such as e.g. films or coextruded layers, correspondingly higher concentrations are required.

The invention therefore also provides the use of said oxide particles for the production of compositions containing
a) a transparent thermoplastic polymer and
b) the oxide particles, preferably in a quantity of 0.01 to 30 parts by weight, particularly preferably 0.1 to 2 parts by weight, per 100 parts by weight of transparent, thermoplastic polymer and
c) organic NIR absorbers.

The invention further provides a process for the production of said compositions by addition of the oxide particles and the organic NIR absorbers, together or separately, before, during or after polymerisation of the transparent, thermoplastic polymer to the transparent thermoplastic polymer or to the monomers from which the transparent thermoplastic polymer is polymerised.

The invention further provides the use of said compositions in the manufacture of sheets, films, glazing systems, roofing systems or other products.

The invention further provides a process for the manufacture of products from said compositions consisting in processing the compositions by extrusion or injection moulding.

The invention further provides products containing said compositions. Preferably, the products substantially contain said compositions. Particularly preferably, the products consist of said compositions.

The invention particularly provides sheets or films or glazing systems or roofing systems containing said compositions. Preferably, the sheets or films or glazing systems or roofing systems substantially contain said compositions. Particularly preferably, the sheets or films or glazing systems or roofing systems consist of said compositions.

Preferred oxide particles according to the invention are oxide particles consisting of indium oxide in which 2 to 30% of the indium atoms are replaced by tin atoms (known as tin-doped indium oxide, abbreviated to ITO). Particularly preferred is indium oxide in which 4 to 12% of the indium atoms are replaced by tin atoms.

Preferred oxide particles are further those consisting of tin oxide in which 2 to 60% of the tin atoms are replaced by antimony atoms (known as antimony-doped tin oxide, abbreviated to ATO).

Further preferred oxide particles are those consisting of indium oxide in which 10 to 70% of the oxygen atoms are replaced by fluorine atoms (known as fluorine-doped tin oxide, abbreviated to FTO).

Further preferred oxide particles are those consisting of zinc oxide in which 1 to 30% of the zinc atoms are replaced by aluminium atoms (known as aluminium-doped zinc oxide, abbreviated to AZO).

The average particle size of the oxide particles according to the invention (measured by means of ultracentrifugation) is less than 200 nm. It is preferably between 3 nm and 200 nm, particularly preferably between 5 nm and 50 nm, most particularly preferably between 5 nm and 30 nm.

The oxide particles according to the invention are protected against agglomeration during processing (e.g. production of the compositions according to the invention) by means of a special surface treatment (also known as surface modification) with surface modifiers. Polyvinyl acetals and compounds having the general formula (I)

are suitable for a surface treatment, whereby the stated definitions for $R^1$, $R^2$, $R^3$ and $R^4$ apply.

Particularly suitable are n-octadecyl trimethoxysilane, n-hexadecyl trimethoxysilane, methyl-n-octadecyl dimethoxysilane, dimethyl-n-octadecyl methoxysilane, n-dodecyl triethoxysilane, n-octadecyl methyl diethoxysilane.

Most particularly suitable are n-octadecyl trimethoxysilane and n-hexadecyl trimethoxysilane.

Polyvinyl acetals, particularly polyvinyl butyral (PVB) are also suitable.

Mixtures of several of the cited surface modifiers are also suitable.

The $SiR^1R^2R^3R^4$ compounds having the general formula (I) can be produced according to known methods. They are also commercially available, for example from Aldrich (D-89555 Steinheim, Germany).

The surface modification of the oxide particles according to the invention can be performed by any method known to the person skilled in the art.

The oxide particles according to the invention can be produced according to known methods. By way of example and as preferred method, a process of co-precipitation of salts of the components used, in the presence of one or more surface-modified components, can be used. After removal of the solvent, the powders obtained are calcined under reducing conditions and then subjected to a mechanical comminution treatment following addition of additives and a further surface modifier (dispersing agent).

The following compounds can be used as the surface-modifying component for use in production of the oxide particles according to the invention:
1. Group of mono- and polycarboxylic acids, such as e.g. acetic acid, propionic acid, butyric acid, pentanoic acid, hexanoic acid, acrylic acid, methacrylic acid, crotonic acid, citric acid, adipic acid, succinic acid, glutanic acid, oxalic acid, maleic acid, stearic acid and particularly trioxadecanoic acid together with the corresponding anhydrides.
2. Betacarbonyl compounds, particularly acetyl acetone, 2,4-hexanedione, 3,5-heptanedione, acetoacetic acid and alkyl acetoacetate.
3. Amino acids, particularly β-alanine.
4. Double-comb polymers, particularly Tween80®.
5. Acid amides, particularly caprolactam.

Suitable starting substances for production of the particularly preferred oxide ITO are, particularly, indium chloride, indium nitrate, indium acetate, indium sulfate or indium alkoxides or tin chloride, tin sulfate or tin alkoxides. Primary, secondary, tertiary, aliphatic or aromatic amines, tetramethyl ammonium hydroxide, NaOH, KOH, ammonia (gaseous) and in particular ammonium hydroxide are preferably used for precipitation of the indium and tin precursors. Calcination of the powder thus obtained (an indium tin oxide-hydroxide mixture) is preferably performed under reducing conditions at temperatures of between 200 and 400° C. (preferably 250° C.). The isothermic residence time is e.g. between 15 and 120 minutes, preferably 60 minutes. The reduction can be performed by carbon monoxide or carbon monoxide nitrogen or water vapour, hydrogen or forming gas (hydrogen, nitrogen). The suspension is produced by dispersing the powders e.g. by means of a mechanical comminution process, using the surface-active substances already mentioned above. Comminution is performed e.g. in planetary ball mills, attrition mills and particularly in a mortar mill and in a roll mill, in solvents such as water, toluene, but particularly in ethylene glycol or diethylene glycol monobutyl ether.

Relative to 100 parts by weight of oxide particles according to the invention, the surface modifiers are preferably used in quantities of 10 to 2000 parts, particularly preferably in quantities of 90 to 1000 parts and most particularly preferably in quantities of 90 to 600 parts.

Suitable organic NIR absorbers according to the invention are organic NIR absorbers which display a particularly high light stability and a high thermal stability and which can be processed by conventional means into transparent thermoplastic polymers.

Phthalocyanines and naphthalocyanines are particularly suitable as organic NIR absorbers by reason of their high lightfastness and thermal stability.

Particularly suitable as phthalocyanines are compounds having the general formula (II)

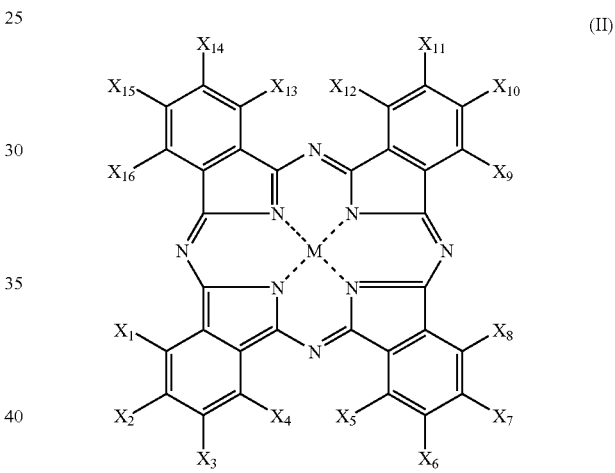

where
M is any metal centre or hydrogen, preferably VO, Cu, Al, Zn, Ni, HH, $SiR_2$, AlR, Mg, Fe, GaR, MnR, SnR, $Na_2$, $Li_2$, TiO and particularly preferably VO or Cu,
R is an aliphatic or aromatic radical, also an alkoxy radical or aryloxy radical and
$X_1$ to $X_{16}$ are mutually independently hydrogen, halogen, aliphatic radical, aromatic radical, alkoxy radical, aryloxy radical, —S alkyl, —S aryl, —NH alkyl, —NH aryl, —N $alkyl_2$, —N $aryl_2$, —NHCO alkyl or —NHCO aryl, whereby bulky radicals such as tert-butyl, phenoxy or phenyl are preferred.

Copper(II) 1,4,8,11,15,18,22,25-octabutoxy-29H,31H-phthalocyanine or vanadyl 2,9,16,23-tetraphenoxy-29H,31H-phthalocyanine are particularly preferred.

The phthalocyanines according to the invention are preferably contained in the compositions according to the invention in concentrations of 0.1 ppm to 1 wt. %, particularly preferably between 1 ppm and 0.1 wt. % and particularly preferably between 30 and 200 ppm.

Particularly suitable as naphthalocyanines are compounds having the formula III

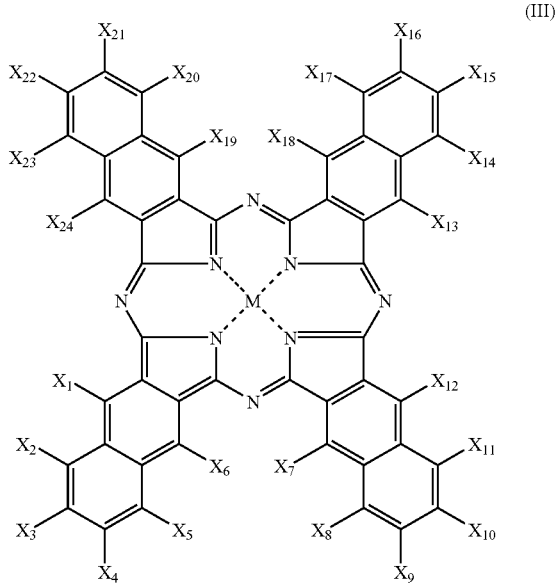

(III)

where

M is any metal centre or hydrogen, preferably VO, Cu, Al, Zn, Ni, HH, $SiR_2$, AlR, Mg, Fe, GaR, MnR, SnR, $Na_2$, $Li_2$, TiO and particularly preferably VO or Cu, R is an aliphatic or aromatic radical, also an alkoxy radical or aryloxy radical and $X_1$ to $X_{24}$ are mutually independently hydrogen, halogen, aliphatic radical, aromatic radical, alkoxy radical, aryloxy radical, —S alkyl, —S aryl, —NH alkyl, —NH aryl, —N alkyl$_2$, —N aryl$_2$, —NHCO alkyl or —NHCO aryl, whereby bulky radicals such as tert-butyl, phenoxy or phenyl are preferred.

Vanadyl 5,14,23,32-tetraphenyl-2,3-naphthalocyanine and vanadyl 2,11,20,29-tetra-tert-butyl-2,3-naphthalocyanine are particularly preferred.

The naphthalocyanines according to the invention are preferably contained in the compositions according to the invention in concentrations of 0.1 ppm to 1 wt. %, particularly preferably between 1 ppm and 0.1 wt. % and most particularly preferably between 30 and 200 ppm.

Mixtures of various naphthalocyanines and phthalocyanines are also suitable. Mixtures of several naphthalocyanines and several phthalocyanines having absorption maxima at different wavelengths of the NIR are preferred.

Mixtures of one or more phthalocyanines or naphthalocyanines with other NIR absorbers can also be used.

Mixtures with conventional dyestuffs that absorb in the visible range can also be used in order to produce a desired colour.

The dyestuffs can be used in concentrations of 0.1 ppm to 1 wt. %, preferably between 1 ppm and 0.1 wt. % and particularly preferably between 10 and 200 ppm.

The NIR absorbers according to the invention can be produced by known means. These are described, for example, in "Phthalocyanines and Related Compounds", Hanack, Heckmann and Polley, Houben-Weyl, Vol. E9d, page 717 to 824, Thiene Verlag, Stuttgart, 1998. Some of these are available commercially.

Transparent thermoplastic polymers in the sense of the invention are, for example, polycarbonates, aromatic polyesters such as e.g., PET, PEN or PETG, transparent thermoplastic polyurethanes, transparent acrylates and methacrylates such as e.g., PMMA, and polyolefins, such as e.g., transparent polypropylene grades or polyolefins based on cyclic olefins (e.g. TOPAS®, a commercial product from Ticona). Mixtures of several transparent thermoplastic polymers are also possible.

Polycarbonates or copolycarbonates are preferred.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Polycarbonates in the sense of the present invention are both homopolycarbonates and copolycarbonates; the polycarbonates can be linear or branched by known means.

The polycarbonates are produced by known means from diphenols, carbonic acid derivatives, optionally chain terminators and optionally branching agents.

Details of the production of polycarbonates have been set down in many patent specifications over some 40 years. Reference is made here by way of example only to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne, BAYER AG, "Polycarbonates" in Encyclopedia of Polymer Science and Engineering, Volume 11, Second Edition, 1988, pages 648–718, and finally to Dres U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag, Munich, Vienna 1992, pages 117–299.

Examples of suitable diphenols for production of the polycarbonates include hydroquinone, resorcinol, dihydroxydiphenyls, bis(hydroxyphenyl)alkanes, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides, α,α'-bis(hydroxyphenyl)diisopropyl benzenes, and ring-alkylated and ring-halogenated compounds thereof.

Preferred diphenols are 4,4'-dihydroxydiphenyl, 2,2-bis(4-hydroxyphenyl)propane, 2,4-bis(4-hydroxyphenyl)-2-methylbutane, 1,1-bis(4-hdyroxyphenyl)-p-diisopropyl benzene, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methyl butane, 1,1-bis(3,5-dimethyl-4-hydroxyphenyl)-p-diisopropyl benzene, 2,2-bis(3,5-dichloro-4-hydroxyphenyl)propane, 2,2-bis(3,5-dibromo-4-hydroxyphenyl)propane and 1,1-bis(4-hydroxyphenyl)-3,3,5-trimethylcyclohexane.

Particularly preferred diphenols are 2,2-bis(4-hydroxyphenyl)propane, 2,2-bis(3,5-dimethyl-4-hydroxyphenyl) propane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane and 1,1-bis(4-hydroxyphenyl)-3,3,5-trimethylcyclohexane.

These and other suitable diphenols are described for example in U.S. Pat. Nos. 3,028,635, 2,999,835, 3,148,172, 2,991,273, 3,271,367, 4,982,014 and 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates only one diphenol is used, in the case of copolycarbonates a plurality of diphenols are used.

Suitable carbonic acid derivatives include, for example, phosgene or diphenyl carbonate.

Suitable chain terminators that can be used in the production of the polycarbonates include both monophenols and monocarboxylic acids. Suitable monophenols are phenol itself, alkyl phenols such as cresols, p-tert-butyl phenol, p-n-octyl phenol, p-isooctyl phenol, p-n-nonyl phenol and p-isononyl phenol, halophenols such as p-chlorophenol, 2,4-dichlorophenol, p-bromophenol and 2,4,6-tribromophenol 2,4,6-triiodine phenol, p-iodine phenol, and mixtures thereof.

The preferred chain terminator is p-tert-butyl phenol.

Suitable monocarboxylic acids also include benzoic acid, alkyl benzoic acids and halobenzoic acids.

Preferred chain terminators are phenols having the formula (IV)

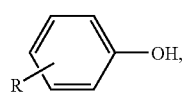

where
R is hydrogen or a $C_1$–$C_{30}$ alkyl radical, linear or branched, is preferably tert-butyl or is a branched or unbranched $C_8$ and/or $C_9$ alkyl radical.

The quantity of chain terminator to be used is preferably 0.1 mol % to 5 mol %, relative to mols of diphenols used in each case. The chain terminators can be added before, during or after phosgenation.

Suitable branching agents are the trifunctional or higher than trifunctional compounds known in polycarbonate chemistry, particularly those having three or more than three phenolic OH groups.

Examples of suitable branching agents include phloroglucinol, 4,6-dimethyl-2,4,6-tri-(4-hydroxyphenyl)heptene-2, 4,6-dimethyl-2,4,6-tri-(4-hydroxyphenyl)heptane, 1,3,5-tri-(4-hydroxyphenyl)benzene, 1,1,1-tri-(4-hydroxyphenyl) ethane, tri-(4-hydroxyphenyl)phenylmethane, 2,2-bis[4,4-bis(4-hydroxyphenyl)cyclohexyl]propane, 2,4-bis(4-hydroxyphenyl isopropyl)phenol, 2,6-bis(2-hydroxy-5'-methyl benzyl)-4-methylphenol, 2-(4-hydroxyphenyl)-2-(2, 4-dihydroxyphenyl)propane, hexa-(4-(4-hydroxyphenyl isopropyl)phenyl)orthoterephthalic acid ester, tetra-(4-hydroxyphenyl)methane, tetra-(4-(4-hydroxyphenyl isopropyl)phenoxy)methane and 1,4-bis(4',4''-dihydroxytriphenyl methyl)benzene as well as 2,4-dihydroxybenzoic acid, trimesic acid, cyanuric chloride and 3,3-bis(3-methyl-4-hydroxyphenyl)-2-oxo-2,3-dihydroindole.

The amount of branching agents to be optionally used is preferably 0.05 mol % to 2 mol %, relative again to mols of diphenols used in each case.

The branching agents can either be included with the diphenols and the chain terminators in the aqueous-alkaline phase or added before phosgenation, dissolved in an organic solvent. If the interesterification method is used, the branching agents are added together with the diphenols.

The compositions according to the invention can also contain other conventional polymer additives, such as e.g. the UV stabilisers, antioxidants and mould release agents described in EP-A 0 839 623, WO 96/15102 and EP-A 0 500 496, but also flame retardants, glass fibres, fillers, foaming agents, pigments, optical brighteners or dyestuffs known from the literature, in the conventional quantities for the relevant thermoplastics. Quantities of up to 5 wt. % are preferred, preferably 0.01 to 5 wt. % relative to the quantity of the compositions, particularly preferably 0.01 wt. % to 1 wt. % relative to the quantity of the compositions. Mixtures of several additives are also suitable.

Particularly suitable UV absorbers and antioxidants according to the invention are described for example in EP-A 0 839 623, WO 96/15102 and EP-A 0 500 496.

Particularly suitable as UV absorbers are benzotriazoles, triazines, benzophenones, together with other compounds such as e.g. arylated cyanoacrylates. Most particularly preferably suitable according to the invention are hydroxy benzotriazoles, such as 2-(3',5'-bis(1,1-dimethylbenzyl)-2'-hydroxyphenyl)benzotriazole (Tinuvin® 234, Ciba Spezialitätenchemie, Basle), Tinuvin® 326 FL (Ciba Spezialitätenchemie, Basle), 2-(2'-hydroxy-5'-(tert-octyl)phenyl) benzotriazole (Tinuvin® 329, Ciba Spezialitätenchemie, Basle), 2-(2'-hydroxy-3'-(2-butyl)-5'-(tert-butyl)phenyl)benzotriazole (Tinuvin® 350, Ciba Spezialitätenchemie, Basle), bis(3-(2H-benzotriazolyl)-2-hydroxy-5-tert-octyl)methane, (Tinuvin® 360, Ciba Spezialitätenchemie, Basle), 2-(4-hexoxy-2-hydroxyphenyl)-4,6-diphenyl-1,3,5-triazine (Tinuvin® 1577, Ciba Spezialitätenchemie, Basle), and the benzophenone 2,4-dihydroxy benzophenone (Chimasorb22®, Ciba Spezialitätenchemie, Basle).

The UV absorbers are preferably used in quantities of between 0.001 wt. % and 10 wt. % in each case, preferably between 0.01 wt. % and 1 wt. %, by preference between 0.1 and 1 wt. % and most particularly preferably between 0.2 and 0.6 wt. %.

The contents of ions present as contamination in the compositions according to the invention are preferably less than 10 ppm, particularly preferably less than 5 ppm.

The measures involved in the production of thermoplastic polycarbonates are familiar to the person skilled in the art.

The compositions according to the invention can be converted into products, i.e. moulded objects such as e.g., toy parts, but also fibres, films, film tapes, sheets, multi-wall sheets, containers, pipes and other profiles, by conventional methods such as e.g., hot press moulding, spinning, extrusion or injection moulding. The use of multi-coat systems is also of interest. These can be applied at the same time as or directly after shaping of the basic form, e.g. by coextrusion or sandwich moulding. However, they can also be applied to the final shaped basic form, e.g. by lamination with a film or by coating with a solution.

The compositions according to the invention can be processed into products by extruding the compositions into pellets, for example, and processing these pellets into various products by known means, by injection moulding or extrusion, optionally after addition of the above-mentioned additives.

The compositions according to the invention can be processed into products by extruding the transparent thermoplastic polymers that have been isolated by known means into pellets and processing these pellets into various articles by injection moulding by known means, optionally after addition of additives. The compositions can however also be processed in a kneader.

The compositions according to the invention can further also contain conventional heat stabilisers. Particularly suitable as heat stabilisers according to the invention are: hindered phenols, for example octadecyl-3-(3',5'-di-tert-butyl-4'-hydroxyphenyl)propionate (Irganox® 1076, Ciba Specialty Chemicals, Basle, Switzerland). Other particularly suitable heat stabilisers according to the invention are phosphites, especially tris(2,4-di-tert-butylphenyl)phosphite (Irgafos® 168, Ciba Specialty Chemicals, Basle, Switzerland), or phosphines, such as e.g. triphenyl phosphine.

The compositions according to the invention can contain conventional mould release agents. Particularly suitable mould release agents are pentaerythritol tetrastearate (PETS) or glycerol monostearate (GMS).

Preferred products according to the invention are sheets, films, glazing systems, such as car sunroofs, roofing systems or building glazing systems containing the compositions according to the invention. As further components of the products according to the invention, in addition to the compositions according to the invention, further material components can for example be contained in the products according to the invention. For example, glazing systems can contain sealants at the edge of the glazing systems. Roofing systems can for example contain metal components such as screws or similar, which can serve to secure the roofing elements.

The compositions according to the invention can be universally used as transparent products wherever diathermancy is undesirable. Use in automotive components, such as e.g., glazing elements, car sunroofs or plastic headlamp diffusers, is particularly suitable. Particularly suitable also is their use in extruded sheets such as e.g., solid sheets, twin-wall sheets or multi-wall sheets, optionally also with one or more coextruded layers, for glazing for buildings or for greenhouses, and their use in injection moulded articles such as food containers, components of electrical devices and in spectacle lenses, e.g. also for safety goggles.

EXAMPLES

To manufacture the test pieces, an additive-free, unstabilised polycarbonate (Makrolon® 2808 with a molecular weight $M_w$ of approx. 28,000 or Makrolon® 3208 with a molecular weight $M_w$ of approx. 31,000, both products from Bayer AG, Leverkusen) was compounded at 300° C. on an extruder with the stated quantity of additive and then pelletised. Coloured specimens (76 mm×50 mm×2.5 mm) were then produced from these pellets by injection moulding.

The LTA value (total luminous transmittance) was determined as a measure for transmission in the visible range of light; the TDS value (solar-direct transmittance) as a measure for the transmittance of the total solar energy. The objective is to obtain as low as possible a TDS value with as high as possible an LTA value. The transmission spectra were measured with a conventional UV-VISNIR spectrometer "lamda 9" from Perkin Elmer. The LTA value and the TDS value were able to be determined from these in accordance with SAE J1796.

Example 1

140 g indium(III) chloride (0.63 mol, anhydrous), 18 g tin(IV) chloride×5 $H_2O$ and 5.6 g caprolactam were added to 1400 ml water and stirred. After a clear solution had been formed, this was heated to 50° C. Once this temperature had been reached, 105 ml ammonium hydroxide solution (25%) were added dropwise with vigorous agitation. The suspension was stirred for a further 24 hours at a temperature of 50° C. A further 280 ml ammonium hydroxide solution were then added to the mixture for full precipitation. A white deposit consisting of indium hydroxide was formed, which was centrifuged off (30 min at 4000 rpm). The powder was dried in a vacuum drying oven at 190° C. until a slight yellowing of the powder could be determined. The dried powder was finely ground in a mortar, spread out in crystallising trays and placed in a forming gas oven. The oven was evacuated, then flooded with nitrogen. The oven was heated at a heating rate of 250° C./hour to 250° C. with a nitrogen flow of 200 litres/hour. This temperature was maintained for 60 minutes under a forming gas atmosphere with a gas flow of 300 litres/hour. The oven then cooled to room temperature under a nitrogen atmosphere (duration approx. 5 hours). This resulted in dark brown ITO powder. 20 parts of n-octadecyl trimethoxysilane were added to 100 parts of a 20% suspension of this ITO powder in ethanol and treated for 1 min in an ultrasonic bath. The solvent was finally removed by distillation at 60° C. and 100 mbar. Nanoscale indium tin oxide (ITO) was obtained with an average particle size of less than 50 nm.

Example 2

Freshly produced nanoscale indium tin oxide (ITO) according to example 1 was used. Makrolon® 2808 was melted at 280° C. on a twin-screw extruder. 0.8 wt. % (example 2a) or 1.5 wt. % (example 2b) of nanoscale ITO were then added directly to the polycarbonate melt. The polymer extrudate was cooled and pelletised. The pellets were dried in a vacuum drying oven at 80° C. and processed into specimens measuring 60 mm×60 mm×2 mm on an injection moulding machine at 280° C.

Example 3

100 parts of Makrolon® 2808 were compounded with 0.3 parts of 2'-hydroxy-3'-(2-butyl)-5'-(tert-butyl)phenyl)benzotriazole (Tinuvin® 350, Ciba Spezialitätenchemie, Basle), 0.47 parts of freshly produced ITO according to example 1, 0.0012 parts of Projet 830 NP (Avecia, Manchester, UK), 0.0025 parts of copper(II) 1,4,8,11,15,18,22,25-octabutoxy-29H,31H-phthalocyanine (Aldrich, D-89555 Steinheim, Germany) and 0.0096 parts of vanadyl 5,14,23,32-tetraphenyl-2,3-naphthalocyanine (Aldrich) at 280° C. and processed to produce coloured specimens as in example 2.

Example 4

100 parts of Makrolon® 2808 were compounded with 0.3 parts of 2'-hydroxy-3'-(2-butyl)-5'-(tert-butyl)phenyl)benzotriazole (Tinuvin® 350, Ciba Spezialitätenchemie, Basle, Switzerland), 0.33 parts of freshly produced ITO according to example 1, 0.0053 parts of copper(II) 1,4,8,11,15,18,22, 25-octabutoxy-29H,31H-phthalocyanine (Aldrich) and 0.0122 parts of vanadyl 5,14,23,32-tetraphenyl-2,3-naphthalocyanine (Aldrich) at 280° C. and processed to produce coloured specimens as in example 2.

Example 5

100 parts of Makrolon® 3208 were compounded with 0.0068 parts of vanadyl 5,14,23,32-tetraphenyl-2,3-naphthalocyaline (Aldrich), 0.0072 parts of copper(II) 1,4,8,11,15, 18,22,25-octabutoxy-29H,31H-phthalocyanine (Aldrich), 0.0038 parts of vanadyl 2,9,16,23-tetraphenoxy-29H,31H-phthalocyanine (Aldrich) and 0.27 parts of 2-(3',5'-bis-(1,1-dimethylbenzyl)-2'-hydroxyphenyl)benzotriazole (Tinuvin® 234, Ciba Spezialitätenchemie, Basle, Switzerland) at 300° C. and processed to produce coloured specimens measuring 2 mm in thickness.

Example 6

100 parts of Makrolon® 2808 were compounded with 0.3% 2'-hydroxy-3'-(2-butyl)-5'-(tert-butyl)phenyl)benzotriazole (Tinuvin® 350, Ciba Spezialitätenchemie, Basle, Switzerland) and processed to produce coloured specimens as in example 2.

Example 7

The LTA and TDS values were determined according to SAE J1796. The LTA and TDS values obtained from examples 2–6 are set out in Table 1.

TABLE 1

LTA and TDS values from examples 2–6

| Example | LTA (in %) | TDS (in %) |
|---|---|---|
| 2a | 65 | 42 |
| 2b | 58 | 31 |
| 3 | 71 | 37 |
| 4 | 70 | 37 |
| 5 | 68 | 49 |
| 6 | 90 | 86 |

The LTA and TDS values in Table 1 show that examples 3 and 4 according to the invention are superior to the others. The TDS value is lowest in examples 3 and 4, apart from example 2b, which has too low an LTA value (the requirement for automotive glazing is an LTA of at least 70% or higher). Unmodified Makrolon® (example 6) has a very high LTA value but also too high a TDS value. Compared with examples 2a and 2b much less ITO is required in examples 3 and 4 (synergistic effect).

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

The invention claimed is:
1. A composition comprising
(a) at least one transparent thermoplastic polymer;
(b) oxide particles selected from one or more of
  (i) indium oxide in which from 2 to 30% of indium atoms are replaced by tin atoms;
  (ii) indium oxide in which from 10 to 70% of oxygen atoms are replaced by fluorine atoms;
  (iii) tin oxide in which from 2 to 60% of tin atoms are replaced by antimony atoms;
  (iv) tin oxide in which from 10 to 70% of oxygen atoms are replaced by fluorine atoms;
  (v) zinc oxide in which from 1 to 30% of zinc atoms are replaced by aluminum atoms;
  (vi) zinc oxide in which from 2 to 30 percent of zinc atoms are replaced by indium atoms;
  (vii) zinc oxide in which from 2 to 30 percent of zinc atoms are replaced by gallium atoms;
  (viii) perovskites; and
  (ix) compounds of formula $A_xBO_{3-y}$ wherein:
  $0.01 < x < 3$;
  $0.001 < y < 1.5$;
  A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or $NH_4$;
  B=W, Mo or Re;
  wherein an average particle size of the oxide particles is less than 200 nm and a surface of the oxide particles is modified with a surface modifier selected from a polyvinylacetal and a compound of formula (I)

$$SiR^1R^2R^3R^4 \quad (I)$$

wherein
  $R^1$ is selected from alkyl groups having from 6 to 30 C atoms;
  $R^2$ is selected from alkyl groups having from 1 to 30 C atoms, alkoxy groups having from 1 to 30 C atoms, Cl, Br and I;
  $R^3$ is selected from alkyl groups having from 1 to 30 C atoms, alkoxy groups having from 1 to 30 C atoms, Cl, Br and I;
  $R^4$ is selected from alkoxy groups having from 1 to 30 C atoms, Cl, Br and I;
(c) one or more organic NIR absorbers; and
(d) at least one UV absorber which comprises a hydroxy benzotriazole compound.

2. The composition of claim 1, wherein the one or more organic NIR absorbers comprise at least one of a phthalocyanine and a naphthalocyanine.

3. The composition of claim 1, wherein the one or more organic NIR absorbers comprise a compound of formula (II)

wherein
M represents a metal or hydrogen
$X_1$ to $X_{16}$ independently represent hydrogen, halogen, an aliphatic radical, an aromatic radical, an alkoxy radical, an aryloxy radical, —S-alkyl, —S-aryl, —NH-alkyl, —NH-aryl, —N(alkyl)$_2$, —N(aryl)$_2$, —NHCO-alkyl or —NHCO-aryl.

4. The composition of claim 1, wherein the one or more organic NIR absorbers comprise a compound of formula (III)

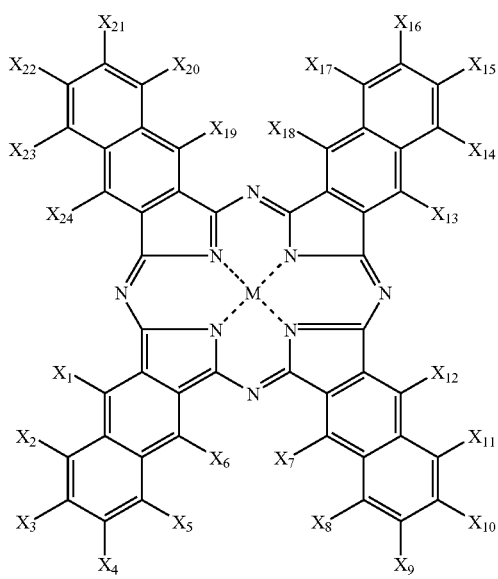

(III)

wherein

M represents a metal or hydrogen $X_1$ to $X_{16}$ independently represent hydrogen, halogen, an aliphatic radical, an aromatic radical, an alkoxy radical, an aryloxy radical, —S-alkyl, —S-aryl, —NH-alkyl, —NH-aryl, —N(alkyl)$_2$, —N(aryl)$_2$, —NHCO-alkyl or —NHCO-aryl.

5. The composition of claim 1, wherein the composition comprises from 0.01 to 30 parts by weight of the oxide particles per 100 parts by weight of the at least one polymer.

6. The composition of claim 5, wherein the composition comprises from 0.1 to 2 parts by weight of the oxide particles per 100 parts by weight of the at least one polymer.

7. The composition of claim 1, wherein the average particle size of the oxide particles is at least 3 nm.

8. The composition of claim 7, wherein the average particle size of the oxide particles is from 5 nm to 50 nm.

9. The composition of claim 1, wherein the composition comprises oxide particles whose surface is modified with one or more of n-octadecyl trimethoxysilane, n-hexadecyl trimethoxysilane, methyl-n-octadecyl dimethoxysilane, dimethyl-n-octadecyl methoxysilane, n-dodecyl triethoxysilane and n-octadecyl methyl diethoxysilane.

10. The composition of claim 8, wherein the oxide particles comprise from 90 to 1,000 parts of surface modifier per 100 parts by weight of unmodified oxide particles.

11. The composition of claim 7, wherein the oxide particles comprise from 90 to 600 parts of surface modifier per 100 parts by weight of unmodified oxide particles.

12. The composition of claim 1, wherein the at least one polymer comprises one or more of a polycarbonate, an aromatic polyester, a polyurethane, an acrylate, a methacrylate and a polyolefin.

13. The composition of claim 12, wherein the at least one polymer comprises a polycarbonate.

14. The composition of claim 1, wherein the composition has an LTA value (transmission in the visible range according to SAE J 1796) of at least 70% and a TDS value (solar-direct transmittance according to SAE J 1976) of below 50%.

15. A process for the production of the composition of claim 1, wherein the process comprises adding to the at least one transparent thermoplastic polymer or monomers from which the at least one transparent thermoplastic polymer is polymerized, the oxide particles, the one or more organic NIR absorbers and the at least one UV absorber, together or separately, before, during or after polymerization of the polymer.

16. A sheet or film which comprises the composition of claim 1.

17. A glazing system or roofing system which comprises the composition of claim 1.

18. An extruded article which comprises the composition of claim 1.

19. An injection molded article which comprises the composition of claim 1.

20. A method of reducing diathermancy in one of a sheet, film, glazing system or roofing system, wherein the method comprises including therein the composition of claim 1.

21. A composition comprising
    (a) at least one transparent thermoplastic polymer which comprises a polycarbonate that is based on at least one of bisphenol A and 1,1-bis(4-hydroxyphenyl)-3,3,5-trimethylcyclohexane;
    (b) oxide particles selected from one or more of
        (i) indium oxide in which from 2 to 30% of indium atoms are replaced by tin atoms;
        (ii) indium oxide in which from 10 to 70% of oxygen atoms are replaced by fluorine atoms;
        (iii) tin oxide in which from 2 to 60% of tin atoms are replaced by antimony atoms;
        (iv) tin oxide in which from 10 to 70% of oxygen atoms are replaced by fluorine atoms;
        (v) zinc oxide in which from 1 to 30% of zinc atoms are replaced by aluminum atoms;
        (vi) zinc oxide in which from 2 to 30 percent of zinc atoms are replaced by indium atoms;
        (vii) zinc oxide in which from 2 to 30 percent of zinc atoms are replaced by gallium atoms;
        (viii) perovskites; and
        (ix) compounds of formula $A_xBO_{3-y}$
        wherein:
        $0.01<x<3$;
        $0.001<y<1.5$;
        A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or NH$_4$;
        B=W, Mo or Re;
        wherein an average particle size of the oxide particles is less than 200 nm and a surface of the oxide particles is modified with a surface modifier selected from a polyvinylacetal and a compound of formula (I)

$$SiR^1R^2R^3R^4 \qquad (I)$$

wherein
    $R^1$ is selected from alkyl groups having from 6 to 30 C atoms;
    $R^2$ is selected from alkyl groups having from 1 to 30 C atoms, alkoxy groups having from 1 to 30 C atoms, Cl, Br and I;
    $R^3$ is selected from alkyl groups having from 1 to 30 C atoms, alkoxy groups having from 1 to 30 C atoms, Cl, Br and I;
    $R^4$ is selected from alkoxy groups having from 1 to 30 C atoms, Cl, Br and I; and
    (c) one or more organic NIR absorbers.

22. The composition of claim 21, wherein the one or more organic NIR absorbers comprise at least one of a phthalocyanine and a naphthalocyanine.

23. The composition of claim 21, wherein the one or more organic NIR absorbers comprise a compound of formula (II)

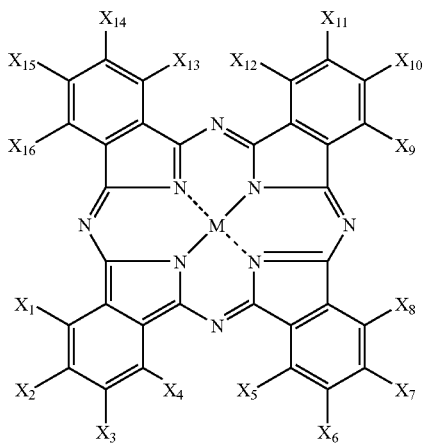

(II)

wherein
M represents a metal or hydrogen
$X_1$ to $X_{16}$ independently represent hydrogen, halogen, an aliphatic radical, an aromatic radical, an alkoxy radical, an aryloxy radical, —S-alkyl, —S-aryl, —NH-alkyl, —NH-aryl, —N(alkyl)$_2$, —N(aryl)$_2$, —NHCO-alkyl or —NHCO-aryl.

24. The composition of claim 21, wherein the one or more organic NIR absorbers comprise a compound of formula (III)

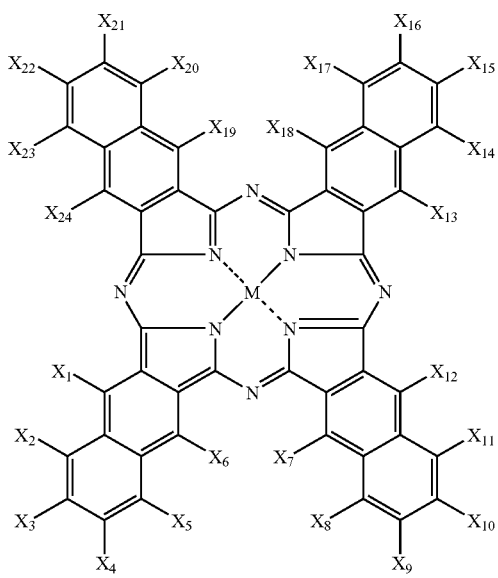

(III)

wherein
M represents a metal or hydrogen
$X_1$ to $X_{16}$ independently represent hydrogen, halogen, an aliphatic radical, an aromatic radical, an alkoxy radical, an aryloxy radical, —S-alkyl, —S-aryl, —NH-alkyl, —NH-aryl, —N(alkyl)$_2$, —N(aryl)$_2$, —NHCO-alkyl or —NHCO-aryl.

25. The composition of claim 21, wherein the composition comprises from 0.01 to 30 parts by weight of the oxide particles per 100 parts by weight of the at least one polymer.

26. The composition of claim 25, wherein the composition comprises from 0.1 to 2 parts by weight of the oxide particles per 100 parts by weight of the at least one polymer.

27. The composition of claim 25, wherein the average particle size of the oxide particles is at least 3 nm.

28. The composition of claim 21, wherein the average particle size of the oxide particles is from 5 nm to 50 nm.

29. The composition of claim 23, wherein the composition comprises oxide particles whose surface is modified with one or more of n-octadecyl trimethoxysilane, n-hexadecyl trimethoxysilane, methyl-n-octadecyl dimethoxysilane, dimethyl-n-octadecyl methoxysilane, n-dodecyl triethyoxysilane and n-octadecyl methyl diethoxysilane.

30. The composition of claim 27, wherein the oxide particles comprise from 90 to 1,000 parts of surface modifier per 100 parts by weight of unmodified oxide particles.

31. The composition of claim 21, wherein the oxide particles comprise from 90 to 600 parts of surface modifier per 100 parts by weight of unmodified oxide particles.

32. The composition of claim 21, wherein the composition has an LTA value (transmission in the visible range according to SAE J 1796) of at least 70% and a TDS value (solar-direct transmittance according to SAE J 1976) of below 50%.

33. The composition of claim 21, wherein the composition comprises at least one UV absorber.

34. A process for the production of the composition of claim 21, wherein the process comprises adding to the at least one transparent thermoplastic polymer or monomers from which the at least one transparent thermoplastic polymer is polymerized, the oxide particles and the one or more organic NIR absorbers, together or separately, before, during or after polymerization of the polymer.

35. A sheet or film which comprises the composition of claim 21.

36. A glazing system or roofing system which comprises the composition of claim 21.

37. An extruded article which comprises the composition of claim 21.

38. An injection molded article which comprises the composition of claim 21.

39. A method of reducing diathermancy in one of a sheet, film, glazing system or roofing system, wherein the method comprises including therein the composition of claim 21.

40. A composition comprising
  (a) at least one transparent thermoplastic polymer;
  (b) oxide particles selected from one or more of
    (i) indium oxide in which from 2 to 30% of indium atoms are replaced by tin atoms;
    (ii) indium oxide in which from 10 to 70% of oxygen atoms are replaced by fluorine atoms;
    (iii) tin oxide in which from 2 to 60% of tin atoms are replaced by antimony atoms;

(iv) tin oxide in which from 10 to 70% of oxygen atoms are replaced by fluorine atoms;

(v) zinc oxide in which from 1 to 30% of zinc atoms are replaced by aluminum atoms;

(vi) zinc oxide in which from 2 to 30 percent of zinc atoms are replaced by indium atoms;

(vii) zinc oxide in which from 2 to 30 percent of zinc atoms are replaced by gallium atoms;

(viii) perovskites; and (ix) compounds of formula $A_xBO_{3-y}$,
wherein:
$0.01<x<3$;
$0.001<y<1.5$;
A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or $NH_4$;
B=W, Mo or Re;
wherein an average particle size of the oxide particles is less than 200 nm and a surface of the oxide particles is modified with polyvinylbutyral; and (c) one or more organic NIR absorbers.

41. The composition of claim 40, wherein the one or more organic NIR absorbers comprise at least one of a phthalocyanine and a naphthalocyanine.

42. The composition of claim 40, wherein the one or more organic NIR absorbers comprise a compound of formula (II)

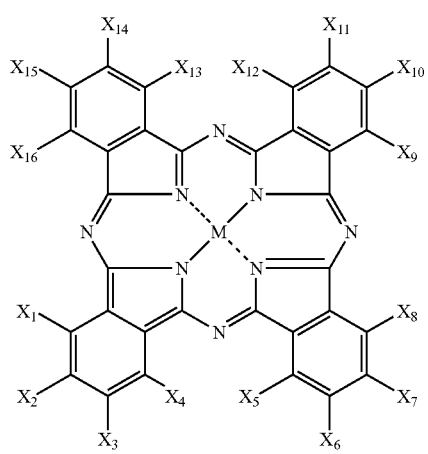

(II)

wherein

M represents a metal or hydrogen $X_1$ to $X_{16}$ independently represent hydrogen, halogen, an aliphatic radical, an aromatic radical, an alkoxy radical, an aryloxy radical, —S-alkyl, —S-aryl, —NH-alkyl, —NH-aryl, —N(alkyl)$_2$, —N(aryl)$_2$, —NHCO-alkyl or —NHCO-aryl.

43. The composition of claim 40, wherein the one or more organic NIR absorbers comprise a compound of formula (III)

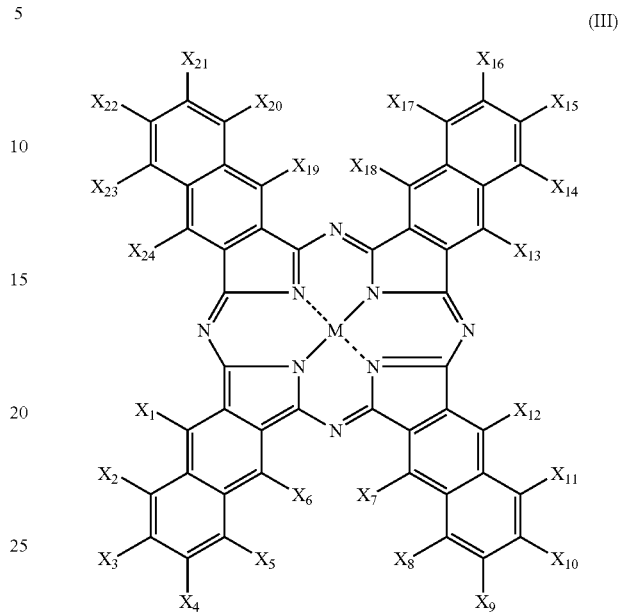

(III)

wherein

M represents a metal or hydrogen $X_1$ to $X_{16}$ independently represent hydrogen, halogen, an aliphatic radical, an aromatic radical, an alkoxy radical, an aryloxy radical, —S-alkyl, —S-aryl, —NH-alkyl, —NH-aryl, —N(alkyl)$_2$, —N(aryl)$_2$, —NHCO-alkyl or —NHCO-aryl.

44. The composition of claim 40, wherein the composition comprises from 0.01 to 30 parts by weight of the oxide particles per 100 parts by weight of the at least one polymer.

45. The composition of claim 40, wherein the average particle size of the oxide particles is at least 3 nm.

46. The composition of claim 40, wherein the oxide particles comprise from 90 to 1,000 parts of polyvinylbutyral per 100 parts by weight of unmodified oxide particles.

47. The composition of claim 45, wherein the at least one polymer comprises one or more of a polycarbonate, an aromatic polyester, a polyurethane, an acrylate, a methacrylate and a polyolefin.

48. The composition of claim 40, wherein the composition has an LTA value (transmission in the visible range according to SAE J 1796) of at least 70% and a TDS value (solar-direct transmittance according to SAE J 1976) of below 50%.

49. The composition of claim 40, wherein the composition comprises at least one UV absorber.

50. A process for the production of the composition of claim 40, wherein the process comprises adding to the at least one transparent thermoplastic polymer or monomers from which the at least one transparent thermoplastic polymer is polymerized, the oxide particles and the one or more organic NIR absorbers, together or separately, before, during or after polymerization of the polymer.

51. A sheet or film which comprises the composition of claim 40.

52. A glazing system or roofing system which comprises the composition of claim 40.

53. An extruded article which comprises the composition of claim 40.

54. An injection molded article which comprises the composition of claim 40.

55. A method of reducing diathermancy in one of a sheet, film, glazing system or roofing system, wherein the method comprises including therein the composition of claim 40.

56. A composition comprising
(a) at least one transparent thermoplastic polymer which comprises a polycarbonate;
(b) oxide particles selected from one or more of
  (i) indium oxide in which from 4 to 12% of indium atoms are replaced by tin atoms;
  (ii) indium oxide in which from 10 to 70% of oxygen atoms are replaced by fluorine atoms;
  (iii) tin oxide in which from 2 to 60% of tin atoms are replaced by antimony atoms;
  (iv) zinc oxide in which from 1 to 30% of zinc atoms are replaced by aluminum atoms;
  wherein an average particle size of the oxide particles is less than 50 nm and a surface of the oxide particles is modified with a surface modifier that is selected from compounds of formula (I)

$$SiR^1R^2R^3R^4 \qquad (I)$$

wherein
$R^1$ is selected from alkyl groups having from 6 to 30 C atoms;
$R^2$ is selected from alkyl groups having from 1 to 30 C atoms, alkoxy groups having from 1 to 30 C atoms, Cl, Br and I;
$R^3$ is selected from alkyl groups having from 1 to 30 C atoms, alkoxy groups having from 1 to 30 C atoms, Cl, Br and I;
$R^4$ is selected from alkoxy groups having from 1 to 30 C atoms, Cl, Br and I;
and comprises one or more of n-octadecyl trimethoxysilane, n-hexadecyl trimethoxysilane, methyl-n-octadecyl dimethoxysilane, dimethyl-n-octadecyl methoxysilane, n-dodecyl triethyoxysilane and n-octadecyl methyl diethoxysilane; the oxide particles comprising from 90 to 600 parts of surface modifier per 100 parts by weight of unmodified oxide particles;
(c) one or more organic NIR absorbers comprising at least one of a phthalocyanine and a naphthalocyanine; and
(d) at least one UV absorber which comprises a hydroxy benzotriazole compound.

57. A sheet or film which comprises the composition of claim 56.

58. A glazing system or roofing system which comprises the composition of claim 56.

59. An extruded article which comprises the composition of claim 56.

60. An injection molded article which comprises the composition of claim 56.

* * * * *